United States Patent
Chen et al.

(10) Patent No.: US 9,503,652 B2
(45) Date of Patent: Nov. 22, 2016

(54) METHOD AND APPARATUS FOR CONTROLLING IMAGE GENERATION OF IMAGE CAPTURE DEVICE BY DETERMINING ONE OR MORE IMAGE CAPTURE SETTINGS USED FOR GENERATING EACH SUBGROUP OF CAPTURED IMAGES

(71) Applicant: MEDIATEK INC., Hsin-Chu (TW)

(72) Inventors: Ding-Yun Chen, Taipei (TW); Cheng-Tsai Ho, Taichung (TW); Chi-Cheng Ju, Hsinchu (TW); Chung-Hung Tsai, Hsin-Chu Hsien (TW)

(73) Assignee: MEDIATEK INC., Hsin-Chu (TW)

( * ) Notice: Subject to any disclaimer, the term of this patent is extended or adjusted under 35 U.S.C. 154(b) by 96 days.

(21) Appl. No.: 14/477,858

(22) Filed: Sep. 4, 2014

(65) Prior Publication Data

US 2015/0097984 A1  Apr. 9, 2015

Related U.S. Application Data (60) Provisional application No. 61/887,602, filed on Oct. 7, 2013.

(51) Int. Cl.
| | |
|---|---|
| *H04N 5/228* | (2006.01) |
| *H04N 5/235* | (2006.01) |
| *H04N 5/217* | (2011.01) |
| *H04N 5/232* | (2006.01) |

(52) U.S. Cl.
CPC .............. *H04N 5/235* (2013.01); *H04N 5/217* (2013.01); *H04N 5/2356* (2013.01); *H04N 5/23232* (2013.01)

(58) Field of Classification Search
CPC .. H04N 5/217; H04N 5/23232; H04N 5/235; H04N 5/2356
USPC .................. 348/222.1, 223.1, 229.1, 241
See application file for complete search history.

(56) References Cited

U.S. PATENT DOCUMENTS

| | | | |
|---|---|---|---|
| 2012/0242853 A1* | 9/2012 | Jasinski ............. | H04N 5/23232 348/222.1 |
| 2013/0335596 A1* | 12/2013 | Demandolx ......... | H04N 5/2354 348/231.99 |
| 2014/0092272 A1* | 4/2014 | Choi .................. | H04N 5/23293 348/222.1 |
| 2014/0300795 A1* | 10/2014 | Bilcu .................. | H04N 5/2258 348/335 |

\* cited by examiner

*Primary Examiner* — Trung Diep
(74) *Attorney, Agent, or Firm* — Winston Hsu; Scott Margo (57) ABSTRACT

An image generation method includes: determining at least one first image capture setting and at least one second image capture setting; controlling an image capture device to generate a plurality of first successive captured images for a capture trigger event according to the at least one first image capture setting and generate a plurality of second successive captured images for the same capture trigger event according to the at least one second image capture setting. Variation of the at least one first image capture setting is constrained within a first predetermined range during generation of the first successive captured images. Difference between the at least one first image capture setting and the at least one second image capture setting is beyond the first predetermined range. Variation of the at least one second image capture setting is constrained within a second predetermined range during generation of the second successive captured images.

30 Claims, 6 Drawing Sheets

METHOD AND APPARATUS FOR CONTROLLING IMAGE GENERATION OF IMAGE CAPTURE DEVICE BY DETERMINING ONE OR MORE IMAGE CAPTURE SETTINGS USED FOR GENERATING EACH SUBGROUP OF CAPTURED IMAGES

CROSS REFERENCE TO RELATED APPLICATIONS

This application claims the benefit of U.S. provisional application No. 61/887,602, filed on Oct. 7, 2013 and incorporated herein by reference.

FIELD OF THE INVENTION

The invention relates to generating captured images, and more particularly, to a method and apparatus for controlling image generation of an image capture device by determining one or more image capture settings for generating each subgroup of captured images.

BACKGROUND

Camera modules have been implemented in many electrical devices such as mobile phones. Hence, the user may use his/her mobile phone to take pictures. Multi-frame imaging is a technique which may be employed by a camera system to generate an image with enhanced visual quality or an image with a special visual effect. For example, a high dynamic range (HDR) image may be generated by combining several images of the same scene that are captured using different exposure time setting. Compared to a traditional single image, the HDR image has a greater range of luminance levels found in real-world scenes and therefore presents more details.

The conventional camera system dynamically modifies a camera setting based on the instant input captured data. That is, the conventional camera system does not apply constrains to the camera setting when generating each of successive images. As a result, the conventional multi-frame imaging design significantly changes the camera setting for each image generation, such that multiple images are captured under camera settings with significant variation. The conventional multi-frame imaging design may satisfy one multi-frame application (e.g., an HDR application), but may fail to satisfy the requirement of another multi-frame application.

SUMMARY

In accordance with exemplary embodiments of the invention, a method and apparatus for controlling image generation of an image capture device by determining one or more image capture settings used for generating each subgroup of captured images are proposed.

According to a first aspect of the invention, an exemplary image generation method is disclosed. The exemplary image generation method includes: determining at least one first image capture setting and at least one second image capture setting; controlling an image capture device to generate a plurality of first successive captured images for a capture trigger event according to the at least one first image capture setting and generate a plurality of second successive captured images for the same capture trigger event according to the at least one second image capture setting. Variation of the at least one first image capture setting is constrained within a first predetermined range during generation of the first successive captured images. Difference between the at least one first image capture setting and the at least one second image capture setting is beyond the first predetermined range. Variation of the at least one second image capture setting is constrained within a second predetermined range during generation of the second successive captured images.

According to a second aspect of the invention, an exemplary controller for controlling image generation of an image capture device is disclosed. The exemplary controller includes a setting circuit and a control circuit. The setting circuit is configured to determining at least one first image capture setting and at least one second image capture setting. The control circuit is configured to control the image capture device to generate a plurality of first successive captured images for a capture trigger event according to the at least one first image capture setting, and control the image capture device to generate a plurality of second successive captured images for the same capture trigger event according to the at least one second image capture setting. The variation of the at least one first image capture setting is constrained within a first predetermined range during generation of the first successive captured images. The difference between the at least one first image capture setting and the at least one second image capture setting is beyond the first predetermined range. The variation of the at least one second image capture setting is constrained within a second predetermined range during generation of the second successive captured images.

According to a third aspect of the invention, an exemplary image generation method is disclosed. The exemplary image generation method includes: determining a first image capture setting; controlling an image capture device to generate a plurality of first successive captured images for a capture trigger event according to the first image capture setting, wherein the first image capture setting is fixed during generation of the first successive captured images; determining a second image capture setting different from the first image capture setting; and controlling the image capture device to generate a plurality of second successive captured images for the same capture trigger event according to the second image capture setting, wherein the second image capture setting is fixed during generation of the second successive captured images.

According to a fourth aspect of the invention, an exemplary controller for controlling image generation of an image capture device is disclosed. The controller includes a setting circuit and a control circuit. The setting circuit is configured to determining a first image capture setting and a second image capture setting, wherein the second image capture setting is different from the first image capture setting. The control circuit is configured to control the image capture device to generate a plurality of first successive captured images for a capture trigger event according to the first image capture setting, wherein the first image capture setting is fixed during generation of the first successive captured images; and control the image capture device to generate a plurality of second successive captured images for the same capture trigger event according to the second image capture setting, wherein the second image capture setting is fixed during generation of the second successive captured images.

These and other objectives of the invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
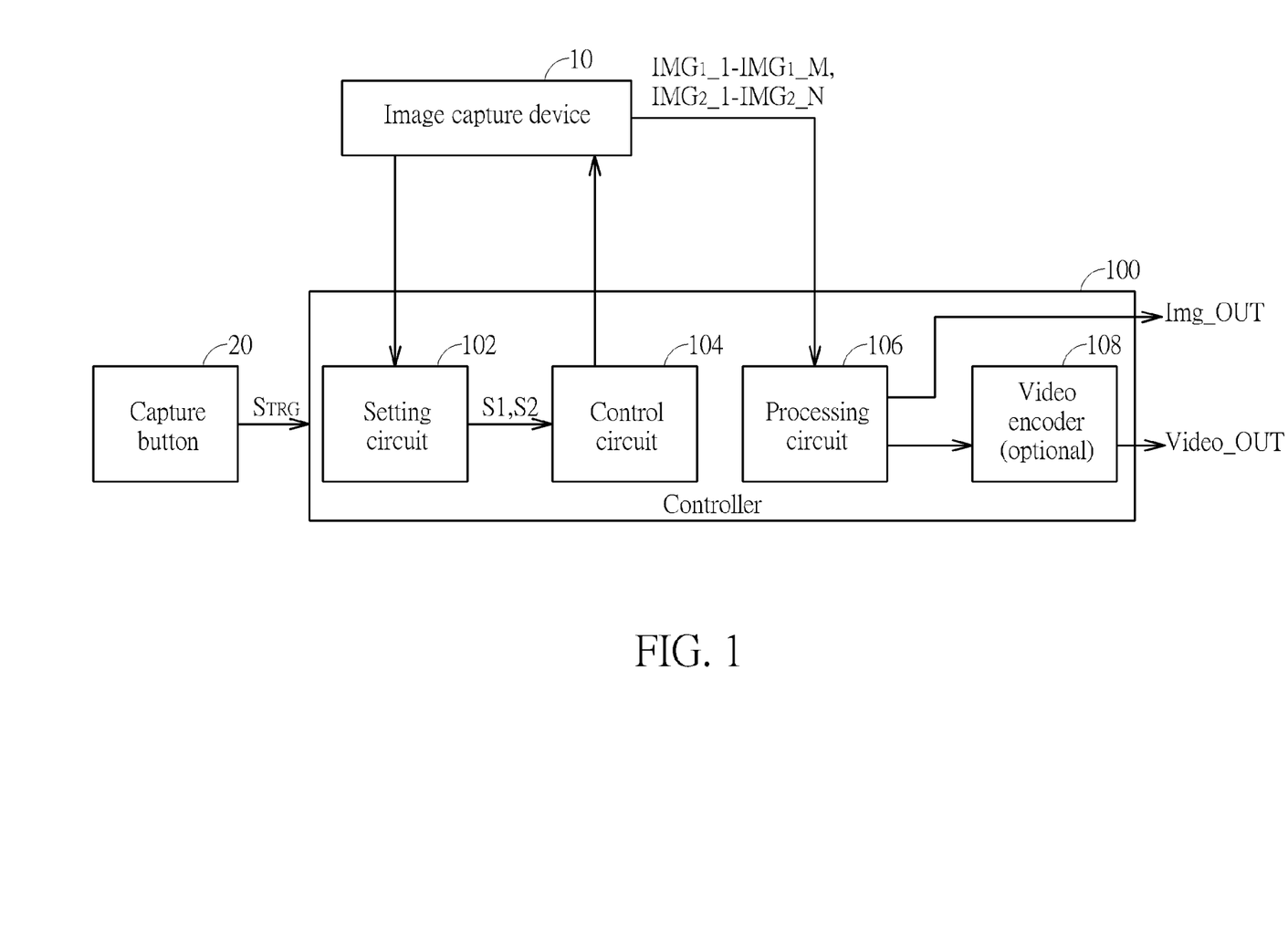
FIG. 1 is a block diagram illustrating a controller for controlling image generation of an image capture device according to an embodiment of the invention.

FIG. 1 is a block diagram illustrating a controller for controlling image generation of an image capture device according to an embodiment of the invention. By way of example, but not limitation, the image capture device 10 may be a camera system of an electronic device (e.g., a mobile phone or a tablet). In this embodiment, the controller 100 includes a setting circuit 102, a control circuit 104, a processing circuit 106, and an optional video encoder 108. It should be noted that only the circuit components pertinent to the invention are shown in FIG. 1. In practice, the controller 100 is allowed to include additional circuit components to achieve other functions. The setting circuit 102 is configured to determine at least one first image capture setting S1 and at least one second image capture setting S2, where the at least one first image capture setting S1 is associated with generation of a first subgroup of captured images, and the at least one second image capture setting S2 is associated with generation of a second subgroup of captured images immediately following the first subgroup of captured images. Before the first subgroup of captured images is actually generated from the image capture device 10, the setting circuit 102 may refer to the input captured data (e.g., preview image data) provided by the image capture device 10 to adaptively adjust the at least one first image capture setting S1. Similarly, before the second subgroup of captured images is actually generated from the image capture device 10, the setting circuit 102 may refer to the input captured data (e.g., preview image data) provided by the image capture device 10 to adaptively adjust the at least one second image capture setting S2. By way of example, but not limitation, each of the at least one first image capture setting S1 and the at least one second image capture setting S2 is set by adjusting at least one of an auto exposure (AE) setting, an auto white balance (AWB) setting, and an auto focus (AF) setting. However, this is for illustrative purposes only, and is not meant to be a limitation of the invention. For example, image capture settings may be set by the setting circuit 102 through adjusting other parameter(s) that may actually affect the image generation of captured images.

In this embodiment, the control circuit 104 is coupled between the setting circuit 102 and the image capture device 10, and used to control image generation of captured images in the image capture device 10 according to image capture settings set by the setting circuit 102. For example, the control circuit 104 is configured to control the image capture device 10 to generate a plurality of first successive captured images $IMG_{1\_}1$-$IMG_{1\_}M$ (e.g., the first subgroup of captured images) for a capture trigger event $S_{TRG}$ according to the at least one first image capture setting S1; and control the image capture device 10 to generate a plurality of second successive captured images $IMG_{2\_}1$-$IMG_{2\_}N$ (e.g., the second subgroup of captured images) for the same capture trigger event $S_{TRG}$ according to the at least one second image capture setting S2. The value of M is a positive integer greater than one, and the value N is also a positive integer greater than one. In one exemplary design, the value of M may be equal to the value of N. In an alternative design, the value of M may be different from the value of N. That is, the invention has no limitation on the number of captured images included in one subgroup generated based on the same image capture setting with no variation or similar image capture settings with slight variation.

The electronic device (e.g., mobile phone or tablet) using the image capture device 10 may have a capture button 20, such as a hardware-based button positioned on the housing of the electronic device or a software-based button displayed on a user interface (e.g., a touch screen) of the electronic device. Hence, a user may press/touch the capture button 20 to input the capture trigger event $S_{TRG}$ to the controller 100 for activating a multi-frame application. For example, the multi-frame application may be a multi-frame low light (MFLL) application for noise reduction or sharpness enhancement. For example, the multi-frame application may be a super-resolution application for image resolution enhancement (or noise reduction). For yet another example, the multi-frame application may be a zero shutter delay (ZSD) application. It should be noted that, based on the requirement of the multi-frame application, the image capture device 10 may start generating captured images (e.g., first captured images $IMG_{1\_}1$-$IMG_{1\_}M$) before the user actually presses/touches the capture button 20 or at the time the user actually presses/touches the capture button 20.

If the image capture device 10 is operated under a picture mode (i.e., the multi-frame application is used to generate a single output image based on multiple captured images), the capture button 20 is a shutter button used to generate a shutter trigger signal as the capture trigger event $S_{TRG}$. If the image capture device 10 is operated under a video recording mode (i.e., the multi-frame application is used to generate a video sequence based on multiple captured images), the capture button 20 is a video recording button used to generate a video recording start signal as the capture trigger event $S_{TRG}$. To put it simply, the proposed controller 100 can be used to control the image generation for any of a camera application and a video recording application.

In this embodiment, with a proper control made by the setting circuit 102, variation of the at least one first image capture setting S1 is constrained within a first predetermined range during generation of the first successive captured images $IMG_1\_1$-$IMG_1\_M$, difference between the at least one first image capture setting S1 and the at least one second image capture setting S2 is beyond the first predetermined range, and variation of the at least one second image capture setting S2 is constrained within a second predetermined range during generation of the second successive captured images $IMG_2\_1$-$IMG_2\_N$. For example, the first subgroup of captured images may be generated under a single fixed image capture setting with no variation or several different image capture settings with slight variation (i.e., multiple image capture settings similar to each other), the second subgroup of captured images may be generated under a single fixed image capture setting with no variation or several different image capture settings with slight variation (i.e., multiple image capture settings similar to each other), and the image capture setting(s) used for generating the second subgroup of captured images is allowed to be significantly different from the image capture setting(s) used for generating the first subgroup of captured images. For better understanding of technical features of the invention, several examples of captured images successively generated from the image capture device 10 are given as below.

Figure 2:
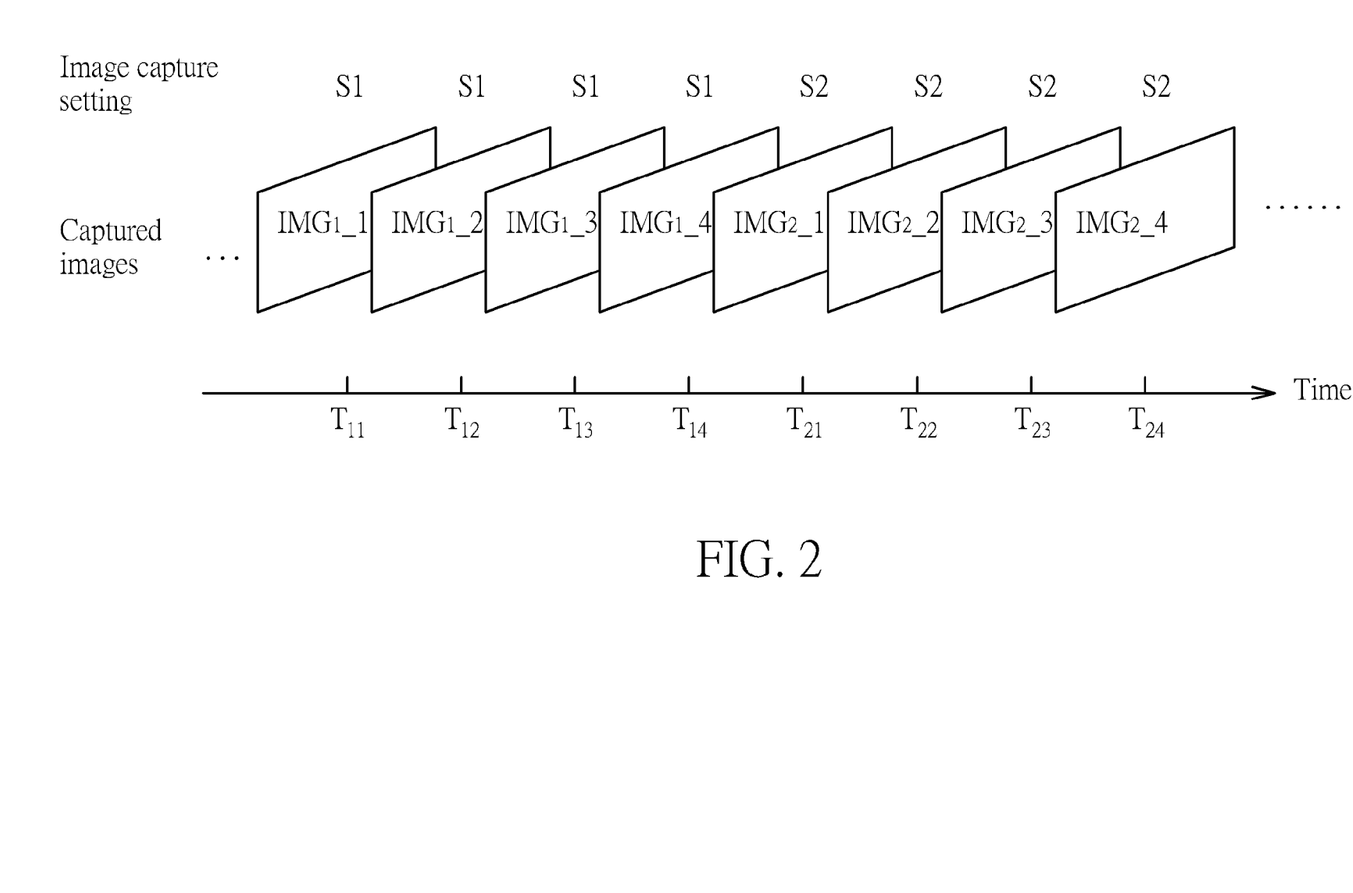
FIG. 2 is a diagram illustrating successive captured images generated from the image capture device shown in FIG. 1 according to one exemplary image capture setting design of the invention.

FIG. 2 is a diagram illustrating successive captured images generated from the image capture device 10 shown in FIG. 1 according to one exemplary image capture setting design of the invention. Considering a case where M=N=4, the first subset of captured images includes first captured images $IMG_1\_1$, $IMG_1\_2$, $IMG_1\_3$ and $IMG_1\_4$ successively generated by the image capture device 10 at time points $T_{11}$, $T_{12}$, $T_{13}$ and $T_{14}$, and the following second subset of captured images includes second captured images $IMG_2\_1$, $IMG_2\_2$, $IMG_2\_3$ and $IMG_2\_4$ successively generated by the image capture device 10 at time points $T_{21}$, $T_{22}$, $T_{23}$ and $T_{24}$. In accordance with this exemplary image capture setting design, the setting circuit 102 sets the image capture setting only once for generation of each subset of captured images. Thus, the aforementioned first and second predetermined ranges would be zero.

For example, after generation of a previous subset of captured images is completed by the image capture device 10, the setting circuit 102 is operative to adjust an image capture setting solely used by generation of a current subset of captured images. As shown in FIG. 2, the setting circuit 102 determines the first image capture setting S1 used by the control circuit 104 for controlling the image capture device 10 to generate a leading captured image (i.e., first captured image $IMG_1\_1$) of the first subset of captured images at the time point $T_{11}$. Next, the same first image capture setting S1 is directly used by the control circuit 104 for controlling the image capture device 10 to generate following captured images (i.e., first captured images $IMG_1\_2$-$IMG_1\_4$) of the first subset of captured images at the time points $T_{12}$-$T_{14}$. Hence, the first image capture setting S1 is fixed during generation of the first subset of captured images. That is, in accordance with this exemplary image capture setting design, the variation of the first image capture setting S1 during generation of the first subset of captured images is substantially zero. It is self-explanatory that the first image capture setting S1 fixed during generation of the first subset of captured images is constrained within the first predetermined range only including a zero variance value.

After the generation of the first subset of captured images is completed by the image capture device 10, the setting circuit 102 is allowed to change the first image capture setting S1 to a new image capture setting (i.e., the second image capture setting S2), where the difference between the first image capture setting S1 and the second image capture setting S2 is beyond the first predetermined range (i.e., a zero variance value in this embodiment). That is, the setting circuit 102 can adaptively set the second image capture setting S2, regardless of the first image capture setting S1. Hence, the first subset of captured images and the second subset of captured images may be generated under different image capture settings that are not intentionally constrained to be identical or similar to each other.

As shown in FIG. 2, the setting circuit 102 determines the second image capture setting S2 used by the control circuit 104 for controlling the image capture device 10 to generate a leading captured image (i.e., second captured image $IMG_2\_1$) of the second subset of captured images at the time point $T_{21}$. Next, the same second image capture setting S2 is directly used by the control circuit 104 for controlling the image capture device 10 to generate following captured images (i.e., second captured images $IMG_2\_2$-$IMG_2\_4$) of the second subset of captured images at the time points $T_{22}$-$T_{24}$. Hence, the second image capture setting S2 is fixed during generation of the second subset of captured images. That is, in accordance with this exemplary image capture setting design, the variation of the second image capture setting S1 during generation of the first subset of captured images is substantially zero. It is self-explanatory that the second image capture setting S2 fixed during generation of the second subset of captured images is constrained within the second predetermined range only including a zero variance value.

Figure 3:
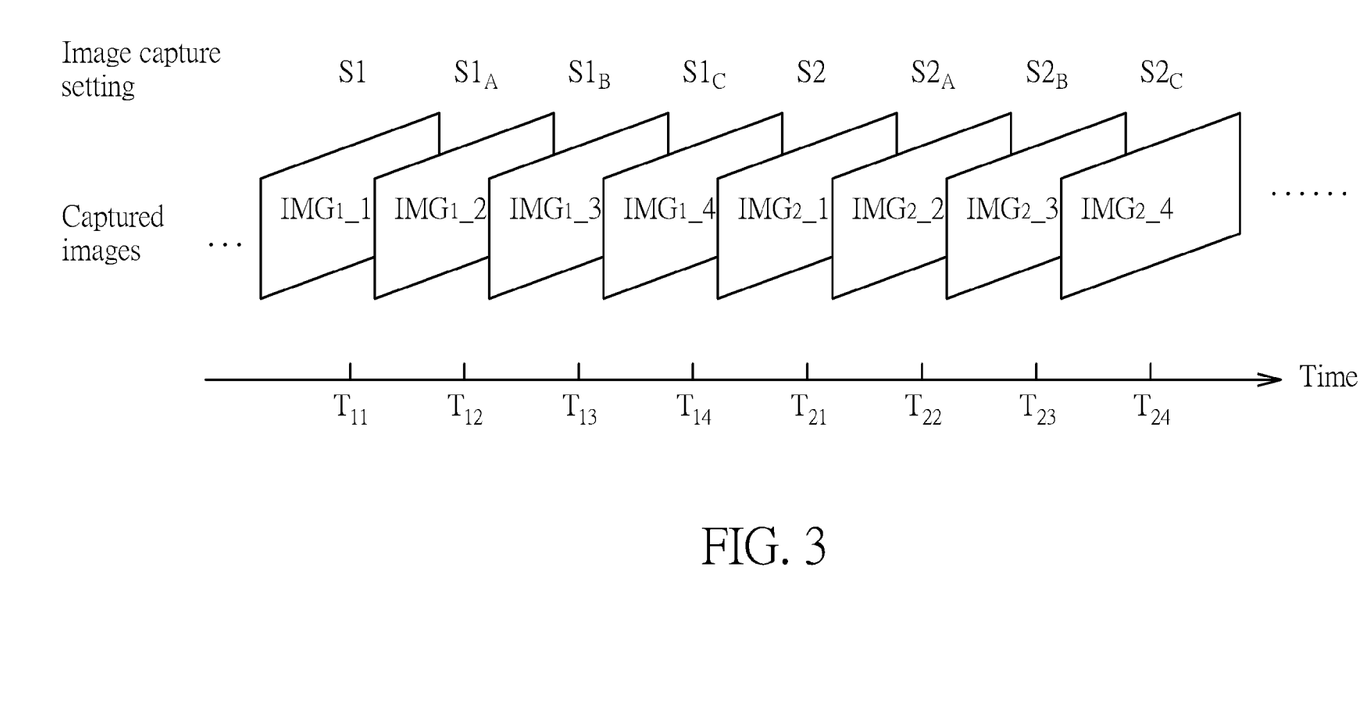
FIG. 3 is a diagram illustrating successive captured images generated from the image capture device shown in FIG. 1 according to another exemplary image capture setting design of the invention.

FIG. 3 is a diagram illustrating successive captured images generated from the image capture device 10 shown in FIG. 1 according to another exemplary image capture setting design of the invention. Considering a case where M=N=4, the first subset of captured images includes first captured images $IMG_1\_1$, $IMG_1\_2$, $IMG_1\_3$ and $IMG_1\_4$ successively generated by the image capture device 10 at time points $T_{11}$, $T_{12}$, $T_{13}$ and $T_{14}$, and the following second subset of captured images includes second captured images $IMG_2\_1$, $IMG_2\_2$, $IMG_2\_3$ and $IMG_2\_4$ successively generated by the image capture device 10 at time points $T_{21}$, $T_{22}$, $T_{23}$ and $T_{24}$. In accordance with this exemplary image capture setting design, the setting circuit 102 sets more than one image capture setting for generation of each subset of captured images. For example, after generation of a previous subset of captured images is completed by the image capture device 10, the setting circuit 102 is operative to adjust image capture settings used by generation of a current subset of captured images. As shown in FIG. 3, the setting circuit 102 determines one first image capture setting S1 used by the control circuit 104 for controlling the image capture device 10 to generate a leading captured image (i.e., first captured image $IMG_1\_1$) of the first subset of captured images at the time point $T_{11}$. Next, the setting circuit 102 determines another first image capture setting $S1_A$ used by the control circuit 104 for controlling the image capture device 10 to generate a following captured image (i.e., first captured image $IMG_1\_2$) of the first subset of captured images at the time point $T_{12}$. By way of example, but not limitation, the first image capture setting $S1_A$ may be derived from fine tuning the first image capture setting S1, such that the first image capture setting $S1_A$ is constrained to be slightly different from the first image capture setting S1. Specifically, the aforementioned first predetermined range specifies the tolerance of varying the first image capture setting during generation of the first subset of captured images.

Similarly, the setting circuit 102 determines another first image capture setting $S1_B$ used by the control circuit 104 for controlling the image capture device 10 to generate a following captured image (i.e., first captured image $IMG_{1\_3}$) of the first subset of captured images at the time point $T_{13}$, and determines another first image capture setting $S1_C$ used by the control circuit 104 for controlling the image capture device 10 to generate a following captured image (i.e., first captured image $IMG_{1\_4}$) of the first subset of captured images at the time point $T_{14}$. As mentioned above, the first predetermined range specifies the tolerance of varying the first image capture setting during generation of the first subset of captured images. By way of example, but not limitation, each of the first image capture settings $S1_B$ and $S1_C$ may be derived from fine tuning the first image capture setting S1, such that the first image capture setting $S1_B/S1_C$ is constrained to be slightly different from the first image capture setting S1. Alternatively, under the premise that the image capture setting variance can meet the requirement, the first image capture setting $S1_B$ may be derived from fine tuning any previous first image capture setting (e.g., $S1_A$), and/or the first image capture setting $S1_C$ may be derived from fine tuning any previous first image capture setting (e.g., $S1_B$).

Concerning generation of the first subset of captured images, the first image capture setting S1 may be regarded as a base image capture setting, and at least one following image capture setting (e.g., first image capture settings $S1_A$-$S1_C$) may be regarded as at least one tracking image capture setting. The base image capture setting and the at least one tracking image capture setting may be different from each other. However, the variation of the base image capture setting and the at least one tracking image capture setting is preferably constrained within the first predetermined range (which may be delimited by an upper bound TH1_HI and a lower bound TH1_LOW). The upper bound TH1_HI may be a preset positive value, and the lower bound TH1_LOW may be a preset negative value. Preferably, absolute values of upper bound TH1_HI and lower bound TH1_LOW are small non-zero values close to zero. However, this is not meant to be a limitation of the invention. In practice, the first predetermined range can be adjusted, depending upon actual design consideration. In this embodiment, the variation of the base image capture setting and each tracking image capture setting is compared with the first predetermined range to ensure that the tracking image capture setting later used for actually generating one captured image is not significantly deviated from the base image capture setting.

In a first exemplary adjustment design, the base image capture setting (e.g., first image capture setting S1 in FIG. 3) is configured based at least partly on a first algorithm, and the at least one tracking image capture setting (e.g., first image capture settings $S1_A$-$S1_C$ in FIG. 3) is configured based at least partly on a second algorithm different from the first algorithm. Specifically, the first algorithm allows the base image capture setting (e.g., first image capture setting S1 in FIG. 3) to be significantly deviated from any image capture setting involved in generation of a previous subset of captured images, and the second algorithm only permits the at least one tracking image capture setting (e.g., first image capture settings $S1_A$-$S1_C$ in FIG. 3) to be slightly deviated from the base image capture setting (e.g., first image capture setting S1 in FIG. 3) involved in generation of a current subset of captured images.

In a second exemplary adjustment design, the base image capture setting (e.g., first image capture setting S1 in FIG. 3) is configured based at least partly on a first parameter, and the at least one tracking image capture setting (e.g., first image capture settings $S1_A$-$S1_C$ in FIG. 3) is configured based at least partly on a second parameter different from the first parameter. For example, the base image capture setting (e.g., first image capture setting S1 in FIG. 3) may be set based on an algorithm with a specific variable set by the first parameter, and the at least one tracking image capture setting (e.g., first image capture settings $S1_A$-$S1_C$ in FIG. 3) may be set based on the same algorithm with the same specific variable set by the second parameter. For another example, the base image capture setting (e.g., first image capture setting S1 in FIG. 3) may be set based on an algorithm with one variable set by the first parameter, and the at least one tracking image capture setting (e.g., first image capture settings $S1_A$-$S1_C$ in FIG. 3) may be set based on the same algorithm with a different variable set by the second parameter. To put it simply, the first parameter allows the base image capture setting (e.g., first image capture setting S1 in FIG. 3) to be significantly deviated from any image capture setting involved in generation of a previous subset of captured images, and the second parameter only permits the at least one tracking image capture setting (e.g., first image capture settings $S1_A$-$S1_C$ in FIG. 3) to be slightly deviated from the base image capture setting (e.g., first image capture setting S1 in FIG. 3) involved in generation of a current subset of captured images.

In a third exemplary adjustment design, the base image capture setting (e.g., first image capture setting S1 in FIG. 3) is configured based on both of the first algorithm and the first parameter mentioned above, and the at least one tracking image capture setting (e.g., first image capture settings $S1_A$-$S1_C$ in FIG. 3) is configured based on both of the second algorithm and the second parameter mentioned above, where the first algorithm is different from the second algorithm, and the first parameter is different from the second parameter.

After the generation of the first subset of captured images is completed by the image capture device 10, the setting circuit 102 is operative to change the first image capture setting S1 to the second image capture setting S2, where the difference between the first image capture setting S1 and the second image capture setting S2 is beyond the first predetermined range. That is, the setting circuit 102 can adaptively set the second image capture setting S2, regardless of the first image capture setting S1. Hence, the first subset of captured images and the second subset of captured images may be generated under different image capture settings that are not intentionally constrained to be identical or similar to each other.

Similarly, the setting circuit 102 is operative to adjust image capture settings used by generation of a current subset of captured images. As shown in FIG. 3, the setting circuit 102 determines one second image capture setting S2 used by the control circuit 104 for controlling the image capture device 10 to generate a leading captured image (i.e., second captured image $IMG_{2\_1}$) of the second subset of captured images at the time point $T_{21}$, and determines other second image capture settings $S2_A$, $S2_B$, $SC_2$ used by the control circuit 104 for controlling the image capture device 10 to generate following captured images (i.e., second captured images $IMG_{2\_}2$-$IMG_{2\_}4$) of the second subset of captured images at the time points $T_{22}$-$T_{24}$.

By way of example, but not limitation, each of the second image capture settings $S2_A$-$S2_C$ may be derived from fine tuning the second image capture setting S2, such that each of the second image capture settings $S2_A$-$S2_C$ is constrained to be slightly different from the second image capture setting S2. Specifically, the aforementioned second predetermined range specifies the tolerance of varying the second image capture setting during generation of the second subset of captured images. Concerning generation of the second subset of captured images, the second image capture setting S2 may be regarded as a base image capture setting, and at least one following image capture setting (e.g., second image capture settings $S2_A$-$S2_C$) may be regarded as at least one tracking image capture setting. The base image capture setting and the at least one tracking image capture setting may be different from each other. However, the variation of the base image capture setting and the at least one tracking image capture setting should be constrained within the second predetermined range (which may be delimited by an upper bound TH2_HI and a lower bound TH2_LOW). The upper bound TH2_HI may be a preset positive value, and the lower bound TH2_LOW may be a preset negative value. Preferably, absolute values of upper bound TH2_HI and lower bound TH2_LOW are small non-zero values close to zero. However, this is not meant to be a limitation of the invention. In practice, the second predetermined range can be adjusted, depending upon actual design consideration. In addition, the second predetermined range may be identical to or different from the first predetermined range, depending upon actual design consideration.

In this embodiment, concerning generation of the second subgroup of captured images, the variation of the base image capture setting and each tracking image capture setting is compared with the second predetermined range to ensure that the tracking image capture setting later used for actually generating one captured image is not significantly deviated from the base image capture setting. Moreover, any of the aforementioned first exemplary adjustment design, second exemplary adjustment design and third exemplary adjustment design may be employed by the setting circuit 102 to configure the base image capture setting (e.g., second image capture setting S2 in FIG. 3) and the at least one tracking image capture setting (e.g., second image capture settings $S2_A$-$S2_C$ in FIG. 3) used for generating the captured images $IMG_{2\_}1$-$IMG_{2\_}4$. Further description is omitted here for brevity.

As mentioned above, a user may press/touch the capture button (e.g., a shutter button or a video recording button) 20 to input the capture trigger event $S_{TRG}$ to the controller 100 for activating a multi-frame application. Hence, the controller 100 may command or trigger the multi-frame application in response to the capture trigger event $S_{TRG}$. The processing circuit 106 may couple to a memory device (not shown) to buffer captured images generated from the image capture device 10. When the multi-frame application is a camera application, the processing circuit 106 may process multiple captured images in the memory device to generate a single output image Img_OUT for the capture trigger event $S_{TRG}$. When the multi-frame application is a video recording application, the processing circuit 106 may process multiple captured images in the memory device to generate output images, and the video encoder 108 may encode each output image generated from the processing circuit 106 as a video frame of a video sequence Video_OUT and output the video sequence Video_OUT for the capture trigger event $S_{TRG}$.

Figure 4:
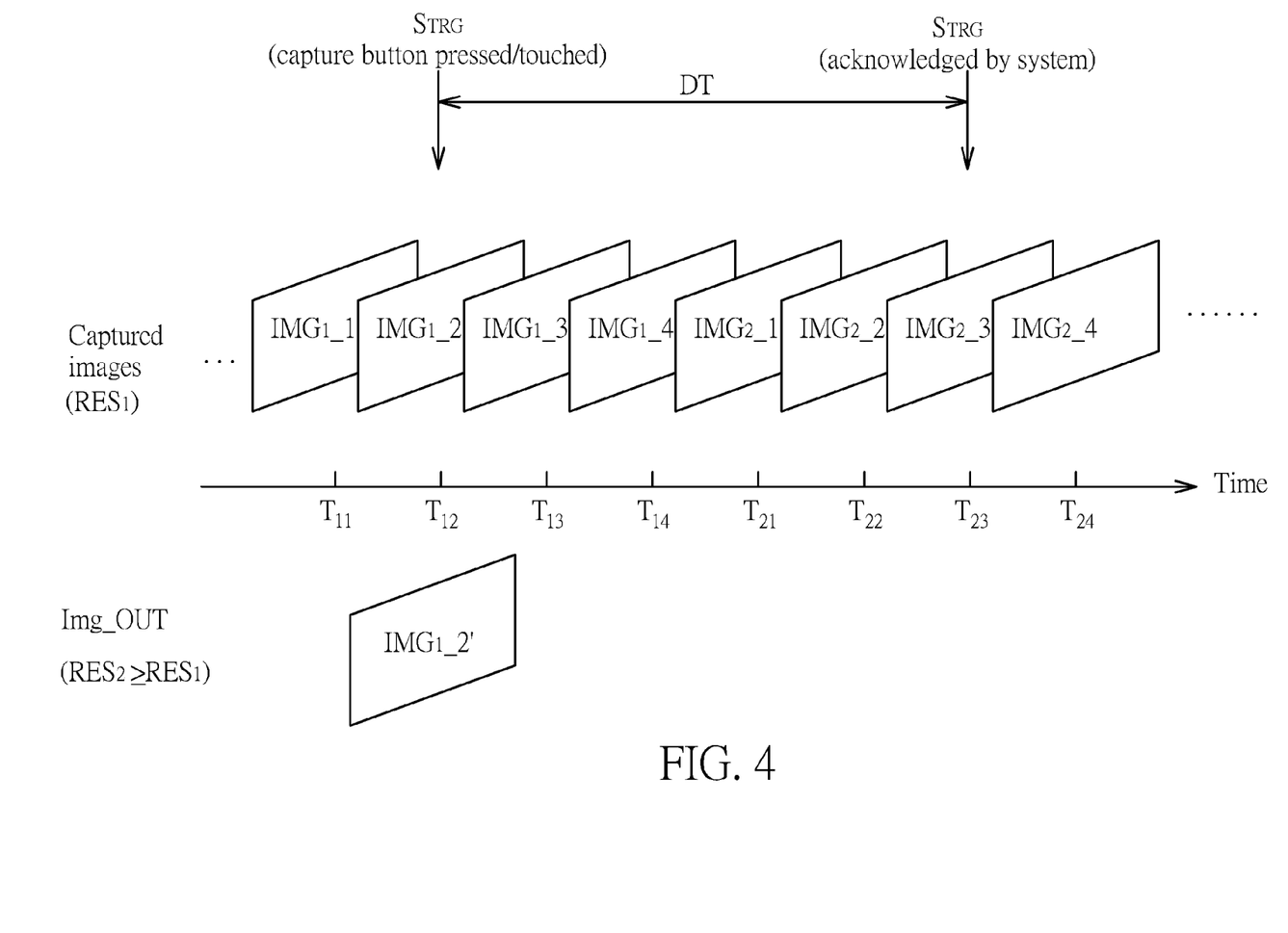
FIG. 4 is a diagram illustrating an image output generated from the controller for a ZSD application according to an embodiment of the invention.

For example, the multi-frame application may be a zero shutter delay (ZSD) application used for generating a ZSD image as the output image Img_OUT. Please refer to FIG. 4, which is a diagram illustrating an image output generated from the controller 100 for a ZSD application according to an embodiment of the invention. The first subset of captured images includes first captured images $IMG_{1\_}1$, $IMG_{1\_}2$, $IMG_{1\_}3$ and $IMG_{1\_}4$ successively generated by the image capture device 10 at time points $T_{11}$, $T_{12}$, $T_{13}$ and $T_{14}$, and the following second subset of captured images includes second captured images $IMG_{2\_}1$, $IMG_{2\_}2$, $IMG_{2\_}3$ and $IMG_{2\_}4$ successively generated by the image capture device 10 at time points $T_{21}$, $T_{22}$, $T_{23}$ and $T_{24}$. The first captured images $IMG_{1\_}1$-$IMG_{1\_}4$ and the second captured images $IMG_{2\_}1$-$IMG_{2\_}4$ may be generated using the image capture settings shown in FIG. 2 or FIG. 3. In this embodiment, the image capture device 10 starts generating captured images before the capture button 20 is pressed/touched, i.e., before the capture trigger event for the ZSD application occurs. As shown in FIG. 4, the user presses/touches the capture button 20 at time point $T_{12}$. However, the capture trigger event $S_{TRG}$ is not immediately acknowledged by the system due to a delay time DT resulting from the system processing the trigger event $S_{TRG}$. In this example, the capture trigger event $S_{TRG}$ is acknowledged by the system at the time point $T_{23}$. Conventionally, a captured image generated at the time the capture trigger event $S_{TRG}$ is acknowledged by the system will be directly used as an output image for the capture trigger event $S_{TRG}$ because the system regards the time point $T_{23}$ as the timing that the user presses/touches the capture button 20. However, due to the unavoidable shutter lag, the image content of this output image is different from the image content the user wants to shoot at the time the capture trigger event $S_{TRG}$ is generated.

In this embodiment, the processing circuit 106 is configured to generate a ZSD image $IMG_{1\_}2'$ corresponding to the time the capture trigger event $S_{TRG}$ is generated. Further, the processing circuit 106 is configured to process multiple captured images to generate the ZSD image $IMG_{1\_}2'$ with enhanced visual quality. By way of example, but not limitation, a multi-frame low light (MFLL) technique may be employed to generate the ZSD image $IMG_{1\_}2'$. The delay time DT is an inherent characteristic, and therefore can be estimated beforehand. Hence, when the system receives the capture trigger event $S_{TRG}$ at time point $T_{23}$, the processing circuit 106 knows the user actually presses/touches the capture button 20 at time point $T_{12}$. As shown in FIG. 4, the capture trigger event $S_{TRG}$ occurs during the generation of the first subgroup of captured images. In other words, the captured image generated at time point $T_{12}$ is the first captured image $IMG_{1\_}2$ belonging to the first subgroup of captured images (which is composed of first successive captured image $IMG_{1\_}1$-$IMG_{1\_}4$). Hence, the processing circuit 106 processes the first successive captured images $IMG_{1\_}1$-$IMG_{1\_}4$ to generate the ZSD image $IMG_{1\_}2'$ as the output image Img_OUT for the ZSD application. For example, the processing circuit 106 may apply noise reduction to the first captured image $IMG_{1\_}2$ according to the first captured images $IMG_{1\_}1$, $IMG_{1\_}3$ and $IMG_{1\_}4$ in the same subgroup, and accordingly generate a noise-reduced image as the ZSD image $IMG_{1\_}2'$, where the ZSD image $IMG_{1\_}2'$ may have an image resolution $RES_2$ equal to the image resolution $RES_1$ of each of the first successive captured image $IMG_{1\_}1$-$IMG_{1\_}4$. For another example, the processing circuit 106 may apply sharpness enhancement to the first captured image $IMG_{1\_}2$ according to the first captured images $IMG_{1\_}1$, $IMG_{1\_}3$ and $IMG_{1\_}4$ in the same subgroup, and accordingly generate a sharpness-enhanced image as the ZSD image $IMG_{1\_}2'$, where the ZSD image $IMG_{1\_}2'$ may have an image resolution $RES_2$ equal to the image resolution $RES_1$ of each of the first successive captured image $IMG_{1\_}1$-$IMG_{1\_}4$. For yet another example, the processing circuit 106 may employ a super-resolution (SR) technique to combine first captured images $IMG_{1\_}1$-$IMG_{1\_}4$ to generate an SR image (or a noise-reduced and/or sharpness-enhanced SR image) as the ZSD image $IMG_{1\_}2'$, where the ZSD image $IMG_{1\_}2'$ may have an image resolution $RES_2$ higher than the image resolution $RES_1$ of each of the first successive captured image $IMG_{1\_}1$-$IMG_{1\_}4$. In this way, the ZSD image $IMG_{1\_}2'$ with enhanced visual quality is generated and outputted for the capture trigger event $S_{TRG}$.

In this example shown in FIG. 4, the ZSD image $IMG_{1\_}2'$ is mainly generated according to the first captured image $IMG_{1\_}2$ (which is selected as a base image due to being obtained at time point $T_{12}$). However, since the first captured images $IMG_{1\_}1$-$IMG_{1\_}4$ belong to the same subgroup, any of the first captured images $IMG_{1\_}1$-$IMG_{1\_}4$ may be directly selected and output as the ZSD image $IMG_{1\_}2'$ in another embodiment. Further, in yet another embodiment, the base image is not necessarily the first captured image $IMG_{1\_}2$ obtained at time point $T_{12}$. For example, one of the first captured images $IMG_{1\_}1$-$IMG_{1\_}4$ in the same subgroup that has the best visual quality may be selected as the base image used for generating the ZSD image $IMG_{1\_}2'$. For example, the processing circuit 106 may estimate sharpness values of the first captured images $IMG_{1\_}1$-$IMG_{1\_}4$ to find a captured image with a largest sharpness value, and regard the captured image with the largest sharpness value as a captured image with the best visual quality among the first captured images $IMG_{1\_}1$-$IMG_{1\_}4$. Hence, the captured image with the largest sharpness value may be selected as the base image used for generating the ZSD image $IMG_{1\_}2'$.

Figure 5:
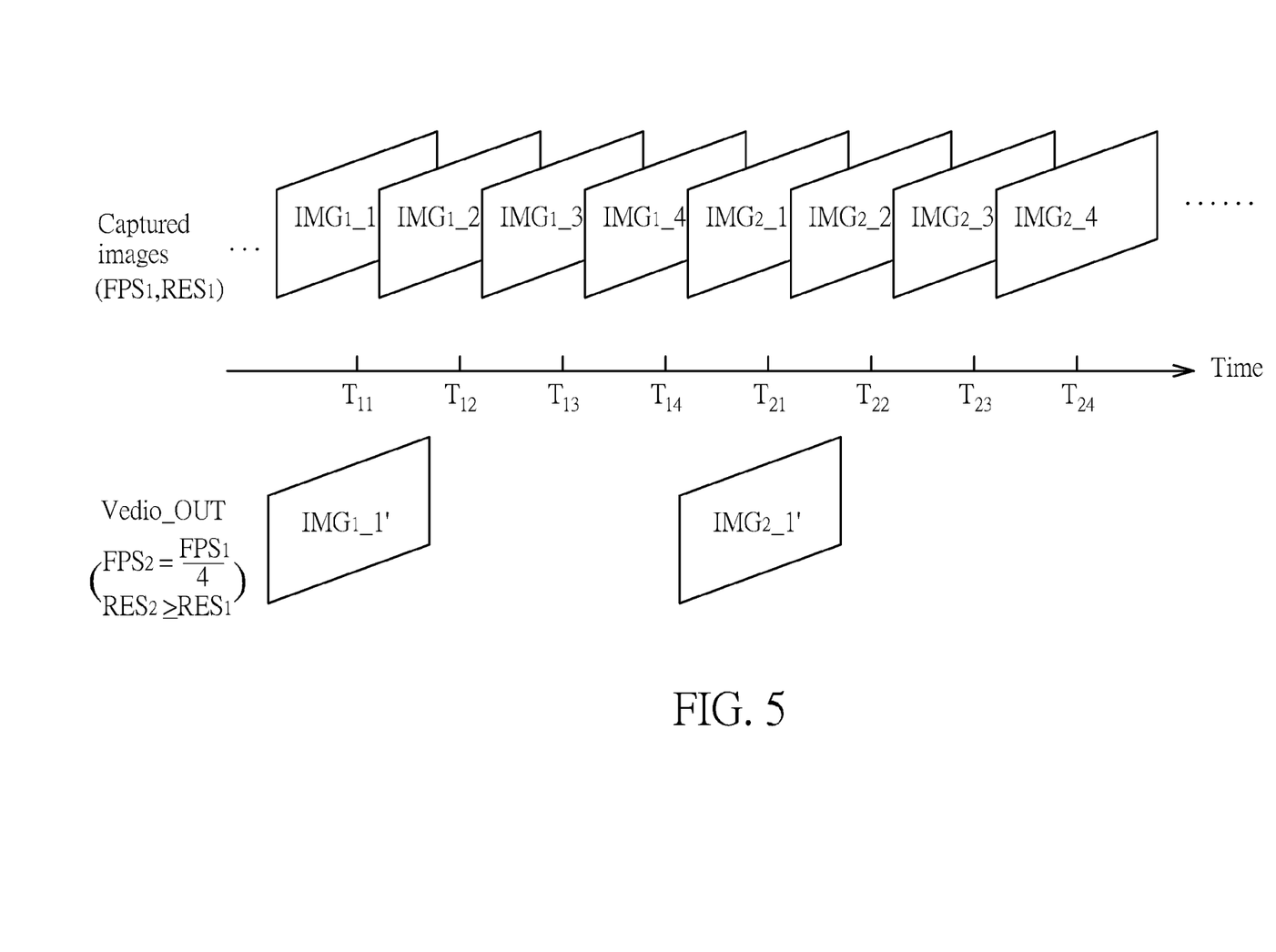
FIG. 5 is a diagram illustrating a video output generated from the controller for a first MFLL video application according to an embodiment of the invention.

Alternatively, the multi-frame application may be an MFLL video application used for generating noise-reduced and/or sharpness-enhanced images (or noise-reduced and/or sharpness-enhanced SR images) as video frames of an MFLL video sequence. Please refer to FIG. 5, which is a diagram illustrating a video output generated from the controller 100 for a first MFLL video application according to an embodiment of the invention. The first subset of captured images includes first captured images $IMG_{1\_}1$, $IMG_{1\_}2$, $IMG_{1\_}3$ and $IMG_{1\_}4$ successively generated by the image capture device 10 at time points $T_{11}$, $T_{12}$, $T_{13}$ and $T_{14}$, and the following second subset of captured images includes second captured images $IMG_{2\_}1$, $IMG_{2\_}2$, $IMG_{2\_}3$ and $IMG_{2\_}4$ successively generated by the image capture device 10 at time points $T_{21}$, $T_{22}$, $T_{23}$ and $T_{24}$. The first captured images $IMG_{1\_}1$-$IMG_{1\_}4$ and the second captured images $IMG_{2\_}1$-$IMG_{2\_}4$ may be generated using the image capture settings shown in FIG. 2 or FIG. 3. In this embodiment, the processing circuit 106 processes each subgroup of captured images to generate one output image, and the video encoder 108 encodes each output image as one video frame of the video sequence Video_OUT. As shown in FIG. 5, the processing circuit 106 processes the first successive captured images $IMG_{1\_}1$-$IMG_{1\_}4$ to generate an output image $IMG_{1\_}1'$ which will be encoded as one video frame, and processes the second successive captured images $IMG_{2\_}1$-$IMG_{2\_}4$ to generate an output image $IMG_{2\_}1'$ which will be encoded as another video frame. For example, the processing circuit 106 may apply noise reduction to the first captured image $IMG_{1\_}1$ according to the other first captured images $IMG_{1\_}2$-$IMG_{1\_}4$ in the same subgroup, thereby generating a noise-reduced image as the output image $IMG_{1\_}1'$; and may apply noise reduction to the second captured image $IMG_{2\_}1$ according to the other second captured images $IMG_{2\_}2$-$IMG_{2\_}4$ in the same subgroup, thereby generating a noise-reduced image as the output image $IMG_{2\_}1'$. For another example, the processing circuit 106 may apply sharpness enhancement to the first captured image $IMG_{1\_}1$ according to the other first captured images $IMG_{1\_}2$-$IMG_{1\_}4$ in the same subgroup, thereby generating a sharpness-enhanced image as the output image $IMG_{1\_}1'$; and may apply sharpness enhancement to the second captured image $IMG_{2\_}1$ according to the other second captured images $IMG_{2\_}2$-$IMG_{2\_}4$ in the same subgroup, thereby generating a sharpness-enhanced image as the output image $IMG_{2\_}1'$. For yet another example, the processing circuit 106 may employ the SR technique to combine the first captured images $IMG_{1\_}1$-$IMG_{1\_}4$ in the same subgroup, thereby generating a noise-reduced and/or sharpness-enhanced SR image as the output image $IMG_{1\_}1'$; and may employ the SR technique to combine the second captured images $IMG_{2\_}1$-$IMG_{2\_}4$ in the same subgroup, thereby generating a noise-reduced and/or sharpness-enhanced SR image as the output image $IMG_{2\_}1'$. In this way, the output images with enhanced visual quality are generated and encoded into the video sequence Video_OUT for the capture trigger event $S_{TRG}$.

Since one quality-enhanced image is generated by combining four captured images in the same subgroup, the frame rate $FPS_2$ of the video sequence Video_OUT is one-fourth of the frame rate $FPS_1$ of captured images successively generated from the image capture device 10. For example, when the frame rate $FPS_1$ is 60 fps (frames per second), the frame rate $FPS_2$ is 15 fps; and when the frame rate $FPS_1$ is 120 fps, the frame rate $FPS_2$ is 30 fps. However, this is for illustrative purposes only, and is not meant to be a limitation of the invention.

Figure 6:
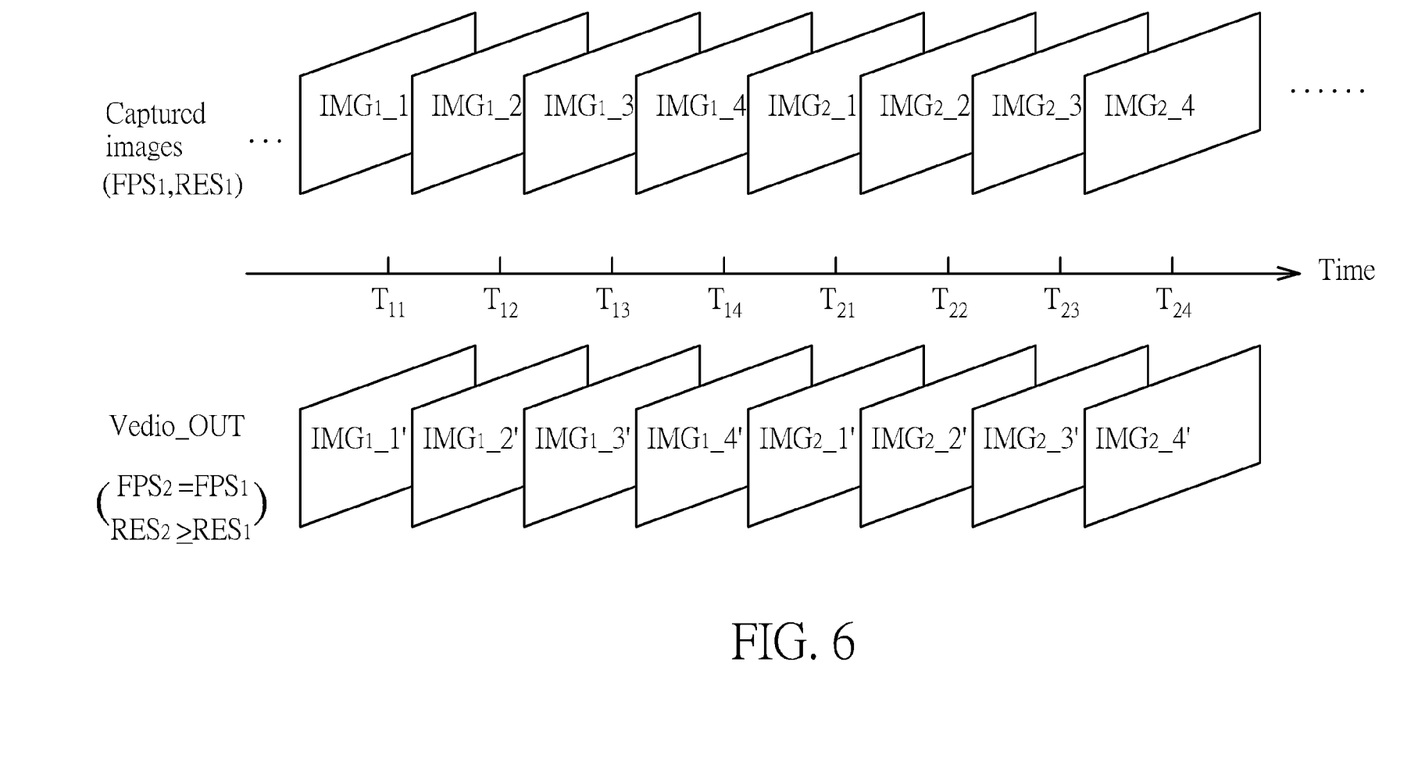
FIG. 6 is a diagram illustrating a video output generated from the controller for a second MFLL video application according to an embodiment of the invention.

Please refer to FIG. 6, which is a diagram illustrating a video output generated from the controller 100 for a second MFLL video application according to an embodiment of the invention. The first subset of captured images includes first captured images $IMG_{1\_}1$, $IMG_{1\_}2$, $IMG_{1\_}3$ and $IMG_{1\_}4$ successively generated by the image capture device 10 at time points $T_{11}$, $T_{12}$, $T_{13}$ and $T_{14}$, and the following second subset of captured images includes second captured images $IMG_{2\_}1$, $IMG_{2\_}2$, $IMG_{2\_}3$ and $IMG_{2\_}4$ successively generated by the image capture device 10 at time points $T_{21}$, $T_{22}$, $T_{23}$ and $T_{24}$. The first captured images $IMG_{1\_}1$-$IMG_{1\_}4$ and the second captured images $IMG_{2\_}1$-$IMG_{2\_}4$ may be generated using the image capture settings shown in FIG. 2 or FIG. 3. In this embodiment, the frame rate $FPS_2$ of the video sequence Video_OUT is equal to the frame rate $FPS_1$ of captured images successively generated from the image capture device 10. The processing circuit 106 is configured to generate a plurality of successive output images according to successive captured images in a subgroup, wherein each of the successive output images is generated by processing the successive captured images in the same subgroup. In addition, the video encoder 108 is configured to encode each of the successive output images as one video frame of the video sequence Video_OUT. In this embodiment, the processing circuit 106 generates first output images $IMG_{1\_}1'$-$IMG_{1\_}4'$ (which will be encoded as video frames) according to first captured images $IMG_{1\_}1$-$IMG_{1\_}4$, and generates second output images $IMG_{2\_}1'$-$IMG_{2\_}4'$ (which will be encoded as video frames) according to second captured images $IMG_{2\_}1$-$IMG_{2\_}4$, where the number of first output images $IMG_{1\_}1'$-$IMG_{1\_}4'$ is equal to the number of first captured images $IMG_{1\_}1$-$IMG_{1\_}4$, the number of second output images $IMG_2\_1'$-$IMG_2\_4'$ is equal to the number of second captured images $IMG_2\_1$-$IMG_2\_4$, and the image resolution $RES_2$ of each output image may be equal to or higher than the image resolution $RES_1$ of each captured image.

In this example shown in FIG. 6, the number of first output images $IMG_1\_1'$-$IMG_1\_4'$ is equal to the number of first captured images $IMG_1\_1$-$IMG_1\_4$, the number of second output images $IMG_2\_1'$-$IMG_2\_4'$ is equal to the number of second captured images $IMG_2\_1$-$IMG_2\_4$. Alternatively, the video sequence Video_OUT may have the frame rate $FPS_2$ lower than the frame rate $FPS_1$. For example, the video sequence Video_OUT generated from the video encoder 108 may only include a portion of the first output images $IMG_1\_1'$-$IMG_1\_4'$ (e.g., $IMG_1\_1'$ and $IMG_1\_3'$) and/or a portion of the second output images $IMG_2\_1'$-$IMG_2\_4'$ (e.g., $IMG_2\_1'$ and $IMG_2\_3'$).

Taking processing of the first captured images $IMG_1\_1$-$IMG_1\_4$ for example, the processing circuit 106 may apply noise reduction to the first captured image $IMG_1\_1$ according to the other first captured images $IMG_1\_2$-$IMG_1\_4$ in the same subgroup, thereby generating a noise-reduced image as the output image $IMG_1\_1'$; apply noise reduction to the first captured image $IMG_1\_2$ according to the other first captured images $IMG_1\_1$, $IMG_1\_3$, $IMG_1\_4$ in the same subgroup, thereby generating a noise-reduced image as the output image $IMG_1\_2'$; apply noise reduction to the first captured image $IMG_1\_3$ according to the other first captured images $IMG_1\_1$, $IMG_1\_2$, $IMG_1\_4$ in the same subgroup, thereby generating a noise-reduced image as the output image $IMG_1\_3'$; and apply noise reduction to the first captured image $IMG_1\_4$ according to the other first captured images $IMG_1\_1$-$IMG_1\_3$ in the same subgroup, thereby generating a noise-reduced image as the output image $IMG_1\_4'$.

Alternatively, the processing circuit 106 may apply sharpness enhancement to the first captured image $IMG_1\_1$ according to the other first captured images $IMG_1\_2$-$IMG_1\_4$ in the same subgroup, thereby generating a sharpness-enhanced image as the output image $IMG_1\_1'$; apply sharpness enhancement to the first captured image $IMG_1\_2$ according to the other first captured images $IMG_1\_1$, $IMG_1\_3$, $IMG_1\_4$ in the same subgroup, thereby generating a sharpness-enhanced image as the output image $IMG_1\_2'$; apply sharpness enhancement to the first captured image $IMG_1\_3$ according to the other first captured images $IMG_1\_1$, $IMG_1\_2$, $IMG_1\_4$ in the same subgroup, thereby generating a sharpness-enhanced image as the output image $IMG_1\_3'$; and apply sharpness enhancement to the first captured image $IMG_1\_4$ according to the other first captured images $IMG_1\_1$-$IMG_1\_3$ in the same subgroup, thereby generating a sharpness-enhanced image as the output image $IMG_1\_4'$.

Alternatively, the processing circuit 106 may apply SR technique to the first captured image $IMG_1\_1$ according to the other first captured images $IMG_1\_2$-$IMG_1\_4$ in the same subgroup (e.g., enhance the image resolution of the main image $IMG_1\_1$ by referring to visual information available in auxiliary images $IMG_1\_2$-$IMG_1\_4$ in the same subgroup), thereby generating a noise-reduced and/or sharpness-enhanced SR image as the output image $IMG_1\_1'$; apply SR technique to the first captured image $IMG_1\_2$ according to the other first captured images $IMG_1\_1$, $IMG_1\_4$ in the same subgroup (e.g., enhance the image resolution of the main image $IMG_1\_2$ by referring visual information available in auxiliary images $IMG_1\_1$, $IMG_1\_3$, $IMG_1\_4$ in the same subgroup), thereby generating a noise-reduced and/or sharpness-enhanced SR image as the output image $IMG_1\_2'$; apply SR technique to the first captured image $IMG_1\_3$ according to the other first captured images $IMG_1\_1$, $IMG_1\_4$ in the same subgroup (e.g., enhance the image resolution of the main image $IMG_1\_3$ by referring to visual information available in auxiliary images $IMG_1\_1$, $IMG_1\_2$, $IMG_1\_4$ in the same subgroup), thereby generating a noise-reduced and/or sharpness-enhanced image as the output image $IMG_1\_3'$; and apply SR technique to the first captured image $IMG_1\_4$ according to the other first captured images $IMG_1\_1$-$IMG_1\_3$ in the same subgroup (e.g., enhance the image resolution of the main image $IMG_1\_4$ by referring to visual information available in auxiliary images $IMG_1\_1$-$IMG_1\_3$ in the same subgroup), thereby generating a noise-reduced and/or sharpness-enhanced SR image as the output image $IMG_1\_4'$.

As a person skilled in the art can readily understand the processing of the second captured images $IMG_2\_1$-$IMG_2\_4$ after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image generation method, comprising:
   determining at least one first image capture setting;
   controlling an image capture device to generate a plurality of first successive captured images for a capture trigger event according to the at least one first image capture setting, wherein variation of the at least one first image capture setting is constrained within a first predetermined range during generation of the first successive captured images;
   determining at least one second image capture setting, wherein difference between the at least one first image capture setting and the at least one second image capture setting is beyond the first predetermined range; and
   controlling the image capture device to generate a plurality of second successive captured images for the same capture trigger event according to the at least one second image capture setting, wherein variation of the at least one second image capture setting is constrained within a second predetermined range during generation of the second successive captured images, the generation of the second successive captured images is performed after the generation of the first successive captured images, and the image capture device generates the second successive captured images regardless of the first successive captured images generated by the image capture device;
   wherein the first successive captured images and the second successive captured images are successively generated by the image capture device at a same frame rate.

2. The image generation method of claim 1, wherein the at least one first image capture setting includes only a single image capture setting that is fixed during the generation of the first successive captured images.

3. The image generation method of claim 1, wherein the at least one first image capture setting includes a base image capture setting and at least one tracking image capture setting following the base image capture setting, the base image capture setting is configured based at least partly on a first algorithm, and the at least one tracking image capture setting is configured based at least partly on a second algorithm different from the first algorithm.

4. The image generation method of claim 1, wherein the at least one first image capture setting includes a base image capture setting and at least one tracking image capture setting following the base image capture setting, the base image capture setting is configured based at least partly on a first parameter, and the at least one tracking image capture setting is configured based at least partly on a second parameter different from the first parameter.

5. The image generation method of claim 1, wherein the at least one first image capture setting includes a base image capture setting and at least one tracking image capture setting, and the at least one tracking image capture setting is derived from fine tuning the base image capture setting.

6. The image generation method of claim 1, wherein each of the at least one first image capture setting and the at least one second image capture setting is set by adjusting at least one of an auto exposure setting, an auto white balance setting, and an auto focus setting.

7. The image generation method of claim 1, further comprising:
processing the first successive captured images to generate an output image.

8. The image generation method of claim 7, wherein the output image is a noise-reduced image.

9. The image generation method of claim 7, wherein the output image is a sharpness-enhanced image.

10. The image generation method of claim 7, wherein a resolution of the output image is higher than a resolution of each of the first successive captured images.

11. The image generation method of claim 7, wherein the capture trigger event occurs during the generation of the first captured images, and the output image is a ZSD (zero shutter delay) image.

12. The image generation method of claim 7, further comprising:
processing the second successive captured images to generate another output image; and
encoding each output image as one video frame of a video sequence.

13. The image generation method of claim 1, further comprising:
generating a plurality of successive output images according to the first successive captured images, wherein each of the successive output images is generated from processing the first successive captured images.

14. The image generation method of claim 13, further comprising:
encoding each of the successive output images as one video frame of a video sequence.

15. A controller for controlling image generation of an image capture device, comprising:
a setting circuit, configured to determining at least one first image capture setting and at least one second image capture setting; and
a control circuit, configured to:
control the image capture device to generate a plurality of first successive captured images for a capture trigger event according to the at least one first image capture setting; and
control the image capture device to generate a plurality of second successive captured images for the same capture trigger event according to the at least one second image capture setting;
wherein variation of the at least one first image capture setting is constrained within a first predetermined range during generation of the first successive captured images, difference between the at least one first image capture setting and the at least one second image capture setting is beyond the first predetermined range, variation of the at least one second image capture setting is constrained within a second predetermined range during generation of the second successive captured images, the generation of the second successive captured images is performed after the generation of the first successive captured images, and the image capture device generates the second successive captured images regardless of the first successive captured images generated by the image capture device;
wherein the first successive captured images and the second successive captured images are successively generated by the image capture device at a same frame rate.

16. The controller of claim 15, wherein the at least one first image capture setting includes only a single image capture setting that is fixed during the generation of the first successive captured images.

17. The controller of claim 15, wherein the at least one first image capture setting includes a base image capture setting and at least one tracking image capture setting following the base image capture setting, the setting circuit determines the base image capture setting based at least partly on a first algorithm, and determines the at least one tracking image capture setting based at least partly on a second algorithm different from the first algorithm.

18. The controller of claim 15, wherein the at least one first image capture setting includes a base image capture setting and at least one tracking image capture setting following the base image capture setting, the setting circuit determines the base image capture setting based at least partly on a first parameter, and determines the at least one tracking image capture setting based at least partly on a second parameter different from the first parameter.

19. The controller of claim 15, wherein the at least one first image capture setting includes a base image capture setting and at least one tracking image capture setting, and the setting circuit derives the at least one tracking image capture setting from fine tuning the base image capture setting.

20. The controller of claim 15, wherein the setting circuit sets each of the at least one first image capture setting and the at least one second image capture setting by adjusting at least one of an auto exposure setting, an auto white balance setting, and an auto focus setting.

21. The controller of claim 15, further comprising:
a processing circuit, configured to process the first successive captured images to generate an output image.

22. The controller of claim 21, wherein the processing circuit generates a noise-reduced image as the output image.

23. The controller of claim 21, wherein processing circuit generates a sharpness-enhanced image as the output image.

24. The controller of claim 21, wherein a resolution of the output image is higher than a resolution of each of the first successive captured images.

25. The controller of claim 21, wherein the capture trigger event occurs during the generation of the first captured images, and the processing circuit generates a ZSD (zero shutter delay) image as the output image.

26. The controller of claim 21, wherein the processing circuit further processes the second successive captured images to generate another output image, and the controller further comprises:

a video encoder, configured to encode each output image as one video frame of a video sequence.

27. The controller of claim 15, further comprising:
a processing circuit, configured to generate a plurality of successive output images according to the first successive captured images, wherein each of the successive output images is generated from processing the first successive captured images.

28. The controller of claim 27, further comprising:
a video encoder, configured to encode each of the successive output images as one video frame of a video sequence.

29. An image generation method, comprising:
determining a first image capture setting;
controlling an image capture device to generate a plurality of first successive captured images for a capture trigger event according to the first image capture setting, wherein the first image capture setting is fixed during generation of the first successive captured images;
determining a second image capture setting, wherein the second image capture setting is different from the first image capture setting; and
controlling the image capture device to generate a plurality of second successive captured images for the same capture trigger event according to the second image capture setting, wherein the second image capture setting is fixed during generation of the second successive captured images, the generation of the second successive captured images is performed after the generation of the first successive captured images, and the image capture device generates the second successive captured images regardless of the first successive captured images generated by the image capture device;
wherein the first successive captured images and the second successive captured images are successively generated by the image capture device at a same frame rate.

30. A controller for controlling image generation of an image capture device, comprising:
a setting circuit, configured to determining a first image capture setting and a second image capture setting, wherein the second image capture setting is different from the first image capture setting; and
a control circuit, configured to:
control the image capture device to generate a plurality of first successive captured images for a capture trigger event according to the first image capture setting, wherein the first image capture setting is fixed during generation of the first successive captured images; and
control the image capture device to generate a plurality of second successive captured images for the same capture trigger event according to the second image capture setting, wherein the second image capture setting is fixed during generation of the second successive captured images, the generation of the second successive captured images is performed after the generation of the first successive captured images, and the image capture device generates the second successive captured images regardless of the first successive captured images generated by the image capture device;
wherein the first successive captured images and the second successive captured images are successively generated by the image capture device at a same frame rate.

* * * * *